United States Patent
Stanek et al.

(10) Patent No.: US 10,759,466 B2
(45) Date of Patent: Sep. 1, 2020

(54) VEHICLE COMPONENT OPERATION

(71) Applicant: Ford Global Technologies, LLC, Dearborn, MI (US)

(72) Inventors: Joseph F. Stanek, Northville, MI (US); Douglas Scott Rhode, Ypsilanti, MI (US); Wassim Mahmoud Nahle, Dearborn Heights, MI (US); Michael Adel Awad Alla, Novi, MI (US); Cheri Lyn Hansen, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 366 days.

(21) Appl. No.: 15/723,514

(22) Filed: Oct. 3, 2017

(65) Prior Publication Data

US 2019/0100231 A1    Apr. 4, 2019

(51) Int. Cl.
| | |
|---|---|
| *B62D 1/28* | (2006.01) |
| *G07C 5/00* | (2006.01) |
| *G07C 5/08* | (2006.01) |
| *G05D 1/00* | (2006.01) |
| *H04L 29/08* | (2006.01) |
| *G07C 9/00* | (2020.01) |

(Continued)

(52) U.S. Cl.
CPC ............ *B62D 1/28* (2013.01); *G05D 1/0022* (2013.01); *G05D 1/0088* (2013.01); *G07C 5/008* (2013.01); *G07C 5/0808* (2013.01); *G07C 9/00174* (2013.01); *G07C 9/00571* (2013.01); *H04L 63/00* (2013.01); *H04L 63/0823* (2013.01); *G05D 2201/0213* (2013.01); *H04L 67/12* (2013.01); *H04L 2012/40273* (2013.01)

(58) Field of Classification Search
CPC ...... B62D 1/28; G05D 1/0022; G05D 1/0088; G05D 2201/0213; G07C 5/008; G07C 5/0808; H04L 67/12; H04L 2012/40273
USPC .......................................................... 701/36
See application file for complete search history.

(56) References Cited

U.S. PATENT DOCUMENTS

| | | | |
|---|---|---|---|
| 7,365,633 B2* | 4/2008 | Inoue ................. | G07C 9/00309 |
| | | | 307/10.1 |
| 7,366,892 B2* | 4/2008 | Spaur ..................... | B60R 25/04 |
| | | | 713/151 |
| 7,471,216 B2 | 12/2008 | Chen et al. | |

(Continued)

FOREIGN PATENT DOCUMENTS

| | | | | |
|---|---|---|---|---|
| CA | 2809689 A1 * | 9/2014 | ............ | G06Q 40/08 |
| DE | 102015013318 A1 * | 4/2017 | ........... | B62D 15/027 |

(Continued)

OTHER PUBLICATIONS

DE-102015013318-A1 Machine translation (Year: 2017).*

(Continued)

*Primary Examiner* — Anne Marie Antonucci
(74) *Attorney, Agent, or Firm* — Frank A. MacKenzie; Bejin Bieneman PLC

(57) ABSTRACT

A system includes a computer including a processor and a memory, the memory including instructions executable by the processor to detect a service controller connected to a vehicle, upon authenticating the service controller, receive an operation mode for a vehicle component from the service controller, and actuate the vehicle component within operating limits based on the operation mode.

20 Claims, 3 Drawing Sheets

(51) Int. Cl.
*H04L 29/06* (2006.01)
*H04L 12/40* (2006.01)

(56) References Cited

U.S. PATENT DOCUMENTS

| | | | |
|---|---|---|---|
| 8,100,217 B2 | 1/2012 | Crombez | |
| 9,283,931 B2* | 3/2016 | Skelton | B60R 25/00 |
| 9,507,346 B1* | 11/2016 | Levinson | G05D 1/0214 |
| 10,109,119 B2* | 10/2018 | Keane | G07C 5/008 |
| 2002/0116117 A1* | 8/2002 | Martens | G08G 1/017 |
| | | | 701/115 |
| 2007/0100514 A1* | 5/2007 | Park | B60R 25/00 |
| | | | 701/2 |
| 2009/0228175 A1* | 9/2009 | Borgesson | B60K 35/00 |
| | | | 701/48 |
| 2009/0248222 A1* | 10/2009 | McGarry | G08G 1/052 |
| | | | 701/2 |
| 2016/0167653 A1 | 6/2016 | Malone et al. | |
| 2016/0264021 A1 | 9/2016 | Gillett | |
| 2017/0323545 A1* | 11/2017 | Gillen | G06Q 10/083 |
| 2018/0164798 A1* | 6/2018 | Poeppel | G05D 1/0016 |
| 2018/0212967 A1* | 7/2018 | Chen | H04L 63/10 |

FOREIGN PATENT DOCUMENTS

| | | |
|---|---|---|
| JP | 2570824 B2 | 10/1996 |
| KR | 101365454 B1 | 3/2014 |
| WO | 2015119264 A1 | 8/2015 |

OTHER PUBLICATIONS

Torchinsky article entitled "Autonomous Cars Must Let Us Wander and Explore Without a Destination in Mind," dated May 23, 2017 5:11pm (4 pages).

* cited by examiner

VEHICLE COMPONENT OPERATION

BACKGROUND

Vehicles can be operated by a user to perform a specific task. The tasks include, e.g., moving the user to a destination, testing a vehicle component, repairing a vehicle component, etc. However, a vehicle may require different users to perform the different tasks. It is a problem to securely control vehicle components for specific tasks performed by multiple users.

DETAILED DESCRIPTION

Figure 1:
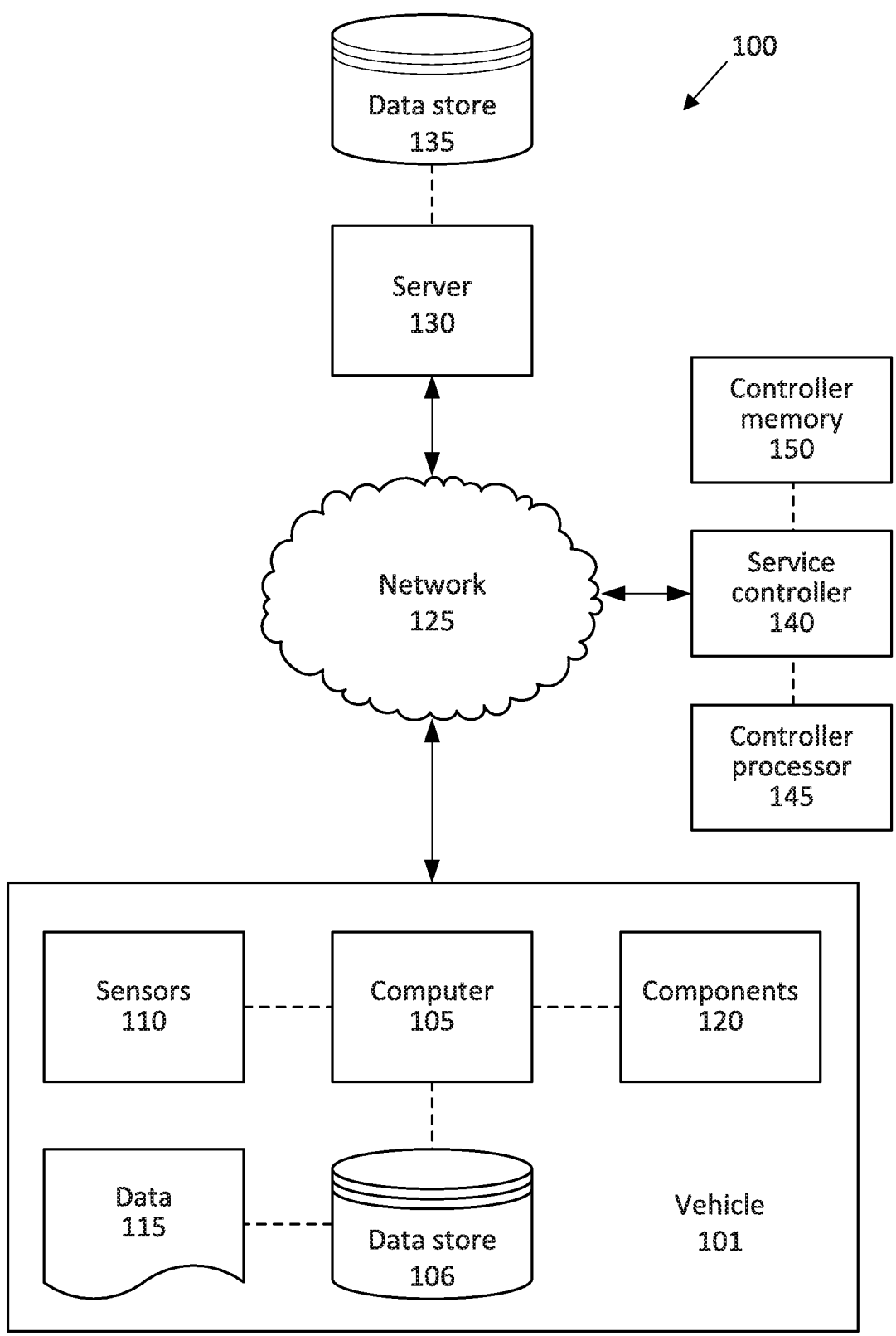
FIG. 1 is a block diagram of an example system for operating a vehicle.

A system includes a computer including a processor and a memory, the memory including instructions executable by the processor to detect a service controller connected to a vehicle, upon authenticating the service controller, receive an operation mode for a vehicle component from the service controller, and actuate the vehicle component within operating limits based on the operation mode.

The vehicle component can be a propulsion.

The instructions can further include instructions to, upon detecting the service controller, prompt the service controller for authentication data. The instructions can further include instructions to, upon receiving the authentication data from the service controller, prompt the service controller for the operation mode.

The instructions can further include instructions to actuate the vehicle component based on user input to the service controller.

The instructions can further include instructions to, upon failing to detect the service controller, deactivate the vehicle.

The operation mode can be a user operation mode wherein the instructions can further include instructions to receive user input to perform a parking maneuver and to actuate the component based on the user input.

The operation mode can be a development mode wherein the instructions can further include instructions to receive user input to perform a performance test and to actuate the component based on the user input.

The operation mode can be a transport mode wherein the instructions can further include instructions to receive user input to move the vehicle onto a towing apparatus and to actuate the component based on the user input.

The instructions can further include instructions to receive instructions from the service controller to actuate the component.

A system includes a service controller, a vehicle component, means for detecting the service controller connected to a vehicle, means for receiving an operation mode for a vehicle component from the service controller upon authenticating the service controller, and means for actuating the vehicle component within operating limits based on the operation mode.

In the system, wherein the vehicle component can be a propulsion.

The system can further include means for prompting the service controller for authentication data upon detecting the service controller. The system can further include means for prompting the service controller for the operation mode upon receiving the authentication data from the service controller.

The system can further include means for actuating the vehicle component based on user input to the service controller.

The system can further include means for deactivating the vehicle upon failing to detect the service controller.

The operation mode can be a user operation mode and the system can further include means for receiving user input to perform a parking maneuver and to actuate the component based on the user input.

The operation mode can be a development mode and the system can further include means for receiving user input to perform a performance test and to actuate the component based on the user input.

The operation mode can be a transport mode and the system can further include means for receiving user input to move the vehicle onto a towing apparatus and to actuate the component based on the user input.

A method includes detecting a service controller connected to a vehicle, upon authenticating the service controller, receiving an operation mode for a vehicle component from the service controller, and actuating the vehicle component within operating limits based on the operation mode.

By using a service controller to apply operating limits to vehicle components, a user can specify operation of the vehicle with specific service controllers. That is, the operation of the vehicle can be tailored to specific user, e.g., service workers, vehicle owners, etc., based on the service controller used by the user. Limiting operation of the vehicle to specific operating limits allows operation of the vehicle by a plurality of users. Operation modes allow users to know the operations performable with the service controller. Furthermore, by receiving authentication data from the service controller, the vehicle can limit operation to authorized users.

FIG. 1 illustrates an example system 100 for operating a vehicle 101. A computer 105 in the vehicle 101 is programmed to receive collected data 115 from one or more sensors 110. For example, vehicle 101 data 115 may include a location of the vehicle 101, data about an environment around a vehicle, data about an object outside the vehicle such as another vehicle, etc. A vehicle 101 location is typically provided in a conventional form, e.g., geo-coordinates such as latitude and longitude coordinates obtained via a navigation system that uses the Global Positioning System (GPS). Further examples of data 115 can include measurements of vehicle 101 systems and components, e.g., a vehicle 101 velocity, a vehicle 101 trajectory, etc.

The computer 105 is generally programmed for communications on a vehicle 101 network, e.g., including a communications bus, as is known. Via the network, bus, and/or other wired or wireless mechanisms (e.g., a wired or wireless local area network in the vehicle 101), the computer 105 may transmit messages to various devices in a vehicle 101 and/or receive messages from the various devices, e.g., controllers, actuators, sensors, etc., including sensors 110. Alternatively or additionally, in cases where the computer 105 actually comprises multiple devices, the vehicle network may be used for communications between devices represented as the computer 105 in this disclosure. In addition, the computer 105 may be programmed for communicating with the network 125, which, as described below, may include various wired and/or wireless networking technologies, e.g., cellular, Bluetooth®, Bluetooth® Low Energy (BLE), wired and/or wireless packet networks, etc.

The data store 106 may be of any known type, e.g., hard disk drives, solid state drives, servers, or any volatile or non-volatile media. The data store 106 may store the collected data 115 sent from the sensors 110.

Sensors 110 may include a variety of devices. For example, as is known, various controllers in a vehicle 101 may operate as sensors 110 to provide data 115 via the vehicle 101 network or bus, e.g., data 115 relating to vehicle speed, acceleration, position, subsystem and/or component status, etc. Further, other sensors 110 could include cameras, motion detectors, etc., i.e., sensors 110 to provide data 115 for evaluating a location of a target, projecting a path of a target, evaluating a location of a roadway lane, etc. The sensors 110 could also include short range radar, long range radar, LIDAR, and/or ultrasonic transducers.

Collected data 115 may include a variety of data collected in a vehicle 101. Examples of collected data 115 are provided above, and moreover, data 115 are generally collected using one or more sensors 110, and may additionally include data calculated therefrom in the computer 105, and/or at the server 130. In general, collected data 115 may include any data that may be gathered by the sensors 110 and/or computed from such data.

The vehicle 101 may include a plurality of vehicle components 120. As used herein, each vehicle component 120 includes one or more hardware components adapted to perform a mechanical function or operation—such as moving the vehicle, slowing or stopping the vehicle, steering the vehicle, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component, a park assist component, an adaptive cruise control component, an adaptive steering component, a movable seat, and the like.

When the computer 105 operates the vehicle 101, the vehicle 101 is an "autonomous" vehicle 101. For purposes of this disclosure, the term "autonomous vehicle" is used to refer to a vehicle 101 operating in a fully autonomous mode. A fully autonomous mode is defined as one in which each of vehicle 101 propulsion (typically via a powertrain including an electric motor and/or internal combustion engine), braking, and steering are controlled by the computer 105. A semi-autonomous mode is one in which at least one of vehicle 101 propulsion (typically via a powertrain including an electric motor and/or internal combustion engine), braking, and steering are controlled at least partly by the computer 105 as opposed to a human operator. In a non-autonomous mode, i.e., a manual mode, the vehicle 101 propulsion, braking, and steering are controlled by the human operator.

The system 100 may further include a network 125 connected to a server 130 and a data store 135. The computer 105 may further be programmed to communicate with one or more remote sites such as the server 130, via the network 125, such remote site possibly including a data store 135. The network 125 represents one or more mechanisms by which a vehicle computer 105 may communicate with a remote server 130. Accordingly, the network 125 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

The system 100 includes a service controller 140. The service controller 140 can be a portable device that communicates over the network 125 with the computer 105. The service controller 140 can be connected to the vehicle 101 with a physical connection, e.g., a wire, a USB connector, etc., and/or can communicate with the computer 105 wirelessly over the network 125. The service controller 140 can include a device for user input, e.g., a joystick, a keyboard, buttons, a directional pad, etc. The service controller 140 can include sensors (not shown) that translate physical motion on or of the device to an electrical signal. The service controller 140 can include a controller processor 145 and a controller memory 150. The controller processor 145 can send an operation mode stored in the controller memory 150 to the computer 105 over the network 125. The controller processor 145 can, based on the electrical signals from the user input device, instruct one or more components 120 to actuate. For example, movement of a throttle lever on the service controller 140 can generate electrical signals that the controller processor 145 reads to generate instructions to a propulsion component 120 to accelerate the vehicle 101.

Figure 2:
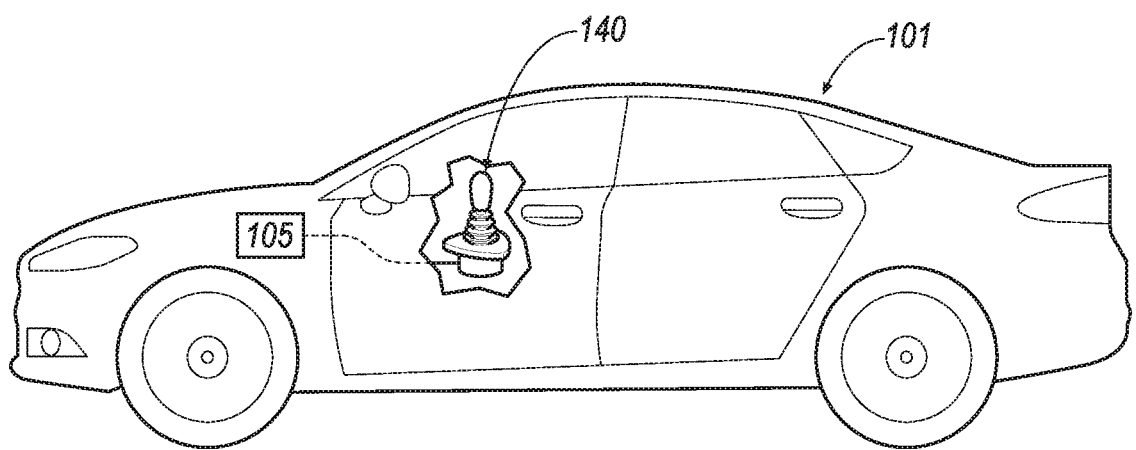
FIG. 2 is a view of the vehicle with an example service controller connected to the vehicle.

FIG. 2 illustrates the service controller 140 connected to the vehicle 101. The service controller 140 can connect to the vehicle 101. The service controller 140 can include a physical connector, e.g., a plug, a USB connector, etc., that can connect to a port in the vehicle 101, e.g., a USB port, an auxiliary cable port, etc. Alternatively, the service controller 140 can connect wirelessly to the vehicle 101, e.g., the service controller processor 145 can communicate with the computer 105 over the network 125.

The controller memory 150 can store one or more operation modes for the vehicle components 120. As used herein, an "operation mode" is a set of instructions for the computer 105 prescribing operating limits for each vehicle component 120. As used herein, "operating limits" are thresholds for one or more parameters of operation of the vehicle component 120, e.g., speed, acceleration, steering angle, etc. The computer 105 can be programmed to operate the vehicle components 120 without exceeding the operating limits. The operating limits in the operation mode can include, e.g., a speed limit for a propulsion component 120, a steering angle limit for a steering component 120, a gear limit for a transmission component 120, an acceleration limit for the propulsion component 120, etc. The service controller 140 can send a message to the computer 105 specifying an operation mode over the network 125. The computer 105 can operate the components 120 according to the operation mode.

One of the operation modes can be a depot mode. The depot mode can provide operating limits to the components 120 for use by service workers at a repair location. At the repair location, the service worker can operate the vehicle 101 to refuel the vehicle 101, wash the vehicle 101, move the vehicle 101 around the premises of the repair location, align the vehicle 101 for repairs, etc. The operating limits for the depot mode can include speed limits to the propulsion component 120 to limit the speed of the vehicle 101 to moving around the repair location. In the depot mode, the service worker can provide input to the service controller 140 to, e.g., refuel the vehicle 101, wash the vehicle 101, move the vehicle 101 around a lot, align the vehicle 101 for maintenance (e.g., an oil change), move the vehicle 101 into a service bay, etc. For example, the service worker can move a joystick on the service controller to accelerate the vehicle 101 and to steer the vehicle 101.

One of the operations can be a user operation mode. In the user operation mode, the operating limits on the components 120 can allow a user of the vehicle 101 to provide user input during parts of a predetermined route, e.g., to perform a parking maneuver. The computer 105 can operate the components 120 in the autonomous mode for a portion of the predetermined route and can operate the components in a manual or semi-autonomous mode during another portion of the predetermined route. When the computer 105 operates the components 120 in the manual or semi-autonomous modes, the computer 105 can accept input from the service controller 140. In the user operation mode, the user can provide input to the service controller 140 to, e.g., adjust a destination of the vehicle 101, perform a parking maneuver, align the vehicle 101 in a roadway lane, etc.

One of the modes can be a transport mode. In the transport mode, a service worker can operate the vehicle 101 onto a towing apparatus. The operating limits for the transport mode can allow the service worker to provide user input to move the vehicle 101 onto a towing apparatus, e.g., for transporting the vehicle 101. In the transport mode, the service worker can provide input to the service controller 140 to, e.g., move the vehicle 101 onto a carrier, move the vehicle 101 onto a flatbed, operate the vehicle 101 onto a towing apparatus, etc.

One of the modes can be a development mode. In the development mode, a service worker can operate the vehicle 101 to perform a performance test for one or more components 120. The operating limits in the development mode can be determined based on the components 120 actuated in the performance test. For example, in the development mode, the service controller 140 can receive user input to, e.g., move the vehicle 101 out from a manufacturing production line, perform a diagnostic test on one or more components 120, calibrate one or more components 120, etc. For example, during a performance test for one of the components 120, the service worker can provide input to a joystick on the service controller to actuate the component 120, e.g., to actuate a steering component 120.

The service controller 140 can control a steering component 120. Based on user input to the service controller 140, the computer 105 can instruct a pinion of the steering component 120 over the network 125 to rotate to a specified angle. Furthermore, the service controller 140 can instruct the computer 105 to actuate a power steering controller to adjust a power steering to steer the vehicle 101. The computer 105 can adjust the steering component 120 with conventional drive-by-wire mechanisms.

The service controller 140 can control a brake component 120. Based on user input to the service controller 140, the computer 105 can adjust a brake pressure, a brake actuation, and/or a gear-shifter to brake the vehicle 101 and allow transmission gears to shift. Furthermore, the service controller 140 can instruct the computer 105 to adjust an anti-lock braking system and/or an electric brake system to brake the vehicle 101.

The service controller 140 can control a propulsion component 120. Based on user input to the service controller 140, the computer 105 can control a throttle, a motor, and/or a fuel injector to accelerate the vehicle 101. Furthermore, the service controller 140 can instruct the computer 105 to adjust a powertrain controller and/or an electric motor controller to accelerate the vehicle 101.

The computer 105 can request authentication data from the service controller 140. The computer 105 can be programmed to accept an operation mode only from a service controller 140 that provides authentication data, ensuring that the service controller 140 is authorized by, e.g., a vehicle 101 owner, service worker, etc. The authentication data can be, e.g., a passcode, a private decryption key, etc. The service controller processor 145 can send the authentication data stored in the controller memory 150 to the computer 105 over the network 125. The computer 105 can confirm the authentication data with, e.g., a conventional mechanism such as a hash function, a TCP three-way handshake, a TLS handshake, or other suitable mechanism. Upon confirming the authentication data, the computer 105 can receive the operation mode from the service controller 140. If the computer 105 does not confirm the authentication data, the computer 105 can refuse instructions and/or input from the service controller 140. Alternatively or additionally, the computer 105 can request authentication data from the server 130. The server 130 can send a message to the service controller 140 requesting authentication data. The service controller processor 145 can send the authentication data to the server 130 over the network 125. The server 130 can confirm the authentication data, as described above. Upon confirming the authentication data, the server 130 can send a message to the computer 105 over the network 125 to accept instructions from the service controller 140.

Figure 3:
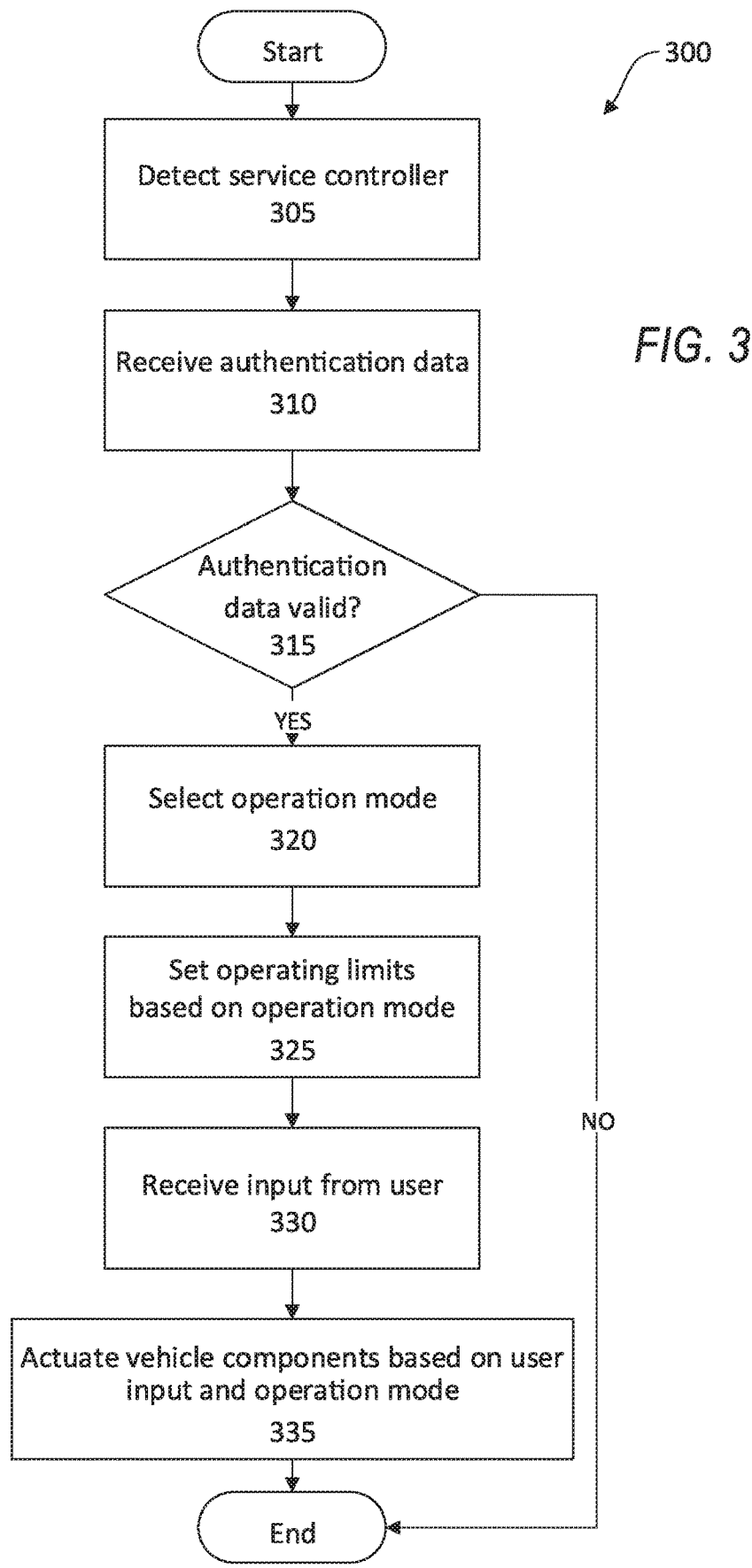
FIG. 3 is a block diagram of an example process for operating the vehicle.

FIG. 3 illustrates an example process 300 for operating a vehicle 101. The process 300 begins in a block 305, in which a computer 105 detects a service controller 140. As described above, a user can connect the service controller 140 to the computer 105 with, e.g., a physical connection in the vehicle 101, a virtual connection over the network 125, etc. The computer 105 can detect when the service controller 140 is connected over the network 125 and/or to the physical connection.

Next, in a block 310, the computer 105 receives authentication data 115 from the service controller 140. As described above, the service controller processor 145 can send authentication data, e.g., a passcode, a handshake program, a private decryption key, etc., to the computer 105. Alternatively or additionally, the service controller processor 145 can send the authentication data to the server 130. The computer 105 can receive the authentication data over the network 125.

Next, in a block 315, the computer 105 determines whether the authentication data is valid. The computer 105 can compare the authentication data with previously stored authentication data, e.g., with a hash function, a TCP handshake, a TLS handshake, etc. Alternatively or additionally, the computer 105 can receive confirmation from the server 130 that the authentication data from the service controller 140 is valid. If the authentication data matches the previously stored authentication data, the computer 105 can determine that the authentication data is valid and the process 300 continues in a block 320. Otherwise, the process 300 ends.

In the block 320, the computer 105 selects an operation mode based on data 115 from the service controller 140. The service controller 140 can include an operation mode, i.e., instructions and operating limits stored in the memory 150 of the service controller 140.

Next, in a block 325, the computer 105 sets operating limits for one or more components 120 based on the operation mode. As described above, the operating limits are thresholds for one or more parameters of operation of the components 120. For example, an operational limit of a speed for a propulsion component 120 forces the computer 105 to operate the propulsion component 120 to move the vehicle 101 no faster than the operational limit.

Next, in a block 330, the computer 105 receives user input from the service controller 140. The user input can be, e.g., motion on a joystick, tactile input to a touchscreen, etc. The computer 105 can receive the user input over the network 125. The service controller processor 145 can receive the user input and transmit a message including the user input over the networks 125 to the computer 105.

Next, in a block 335, the computer 105 actuates one or more components 120 based on the user input and the operation mode. For example, based on user input to a joystick on the service controller 140, the computer 105 can actuate a steering component 120 to turn the vehicle 101. If the user input would result in steering beyond the operation limit, the computer 105 can actuate the steering component 120 to the operation limit. Following the block 335, the process 300 ends.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

Computers 105 generally each include instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 105 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 300, one or more of the steps could be omitted, or the steps could be executed in a different order than shown in FIG. 3. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A system, comprising a computer including a processor and a memory, the memory including instructions executable by the processor to:
   detect a portable service controller in an interior of a vehicle and connected to the vehicle;
   request authentication data authorizing the portable service controller;
   upon confirming the authentication data, receive one of a plurality of operation modes from the portable service controller, each operation mode specifying a plurality of vehicle components and respective thresholds for respective parameters of operation of the plurality of vehicle components; and
   actuate one or more vehicle components below the respective thresholds associated with the operation mode according to user input provided to the portable service controller.

2. The system of claim 1, wherein the one or more vehicle components includes a propulsion component.

3. The system of claim 1, wherein the instructions further include instructions to, upon detecting the service controller, prompt the service controller for authentication data.

4. The system of claim 3, wherein the instructions further include instructions to, upon receiving the authentication data from the service controller, prompt the service controller for the operation mode.

5. The system of claim 1, wherein the instructions further include instructions to actuate the one or more vehicle components based on user input to the service controller.

6. The system of claim 1, wherein the instructions further include instructions to, upon failing to detect the service controller, deactivate the vehicle.

7. The system of claim 1, wherein the operation mode is a user operation mode wherein the instructions further include instructions to receive user input to perform a parking maneuver and to actuate the component based on the user input.

8. The system of claim 1, wherein the operation mode is a development mode wherein the instructions further include instructions to receive user input to perform a performance test and to actuate the one or more vehicle components based on the user input.

9. The system of claim 1, wherein the operation mode is a transport mode wherein the instructions further include instructions to receive user input to move the vehicle onto a towing apparatus and to actuate the one or more vehicle components based on the user input.

10. The system of claim 1, wherein the instructions further include instructions to receive instructions from the service controller to actuate the one or more vehicle components.

11. The system of claim 1, wherein the service controller is physically connected to a port in the vehicle.

12. A system, comprising:
a portable service controller;
one or more vehicle components;
means for detecting the service controller in an interior of a vehicle and connected to the vehicle;
means for requesting authentication data authorizing the portable service controller;
means for receiving one of a plurality of operation modes from the portable service controller upon confirming the authentication data, each operation mode specifying a plurality of vehicle components and respective thresholds for respective parameters of operation of the plurality of vehicle components; and
means for actuating the one or more vehicle components below the respective thresholds associated with the operation mode according to user input provided to the portable service controller.

13. The system of claim 12, wherein the one or more vehicle components includes a propulsion component.

14. The system of claim 12, further comprising means for prompting the service controller for authentication data upon detecting the service controller.

15. The system of claim 14, further comprising means for prompting the service controller for the operation mode upon receiving the authentication data from the service controller.

16. The system of claim 12, further comprising means for actuating the one or more vehicle components based on user input to the service controller.

17. The system of claim 12, wherein the operation mode is a user operation mode and the system further includes means for receiving user input to perform a parking maneuver and to actuate the one or more vehicle components based on the user input.

18. The system of claim 12, wherein the operation mode is a development mode and the system further includes means for receiving user input to perform a performance test and to actuate the one or more vehicle components based on the user input.

19. The system of claim 12, wherein the operation mode is a transport mode and the system further includes means for receiving user input to move the vehicle onto a towing apparatus and to actuate the one or more vehicle components based on the user input.

20. A method, comprising:
detecting a service controller in an interior of a vehicle and connected to the vehicle;
requesting authentication data authorizing the portable service controller;
upon confirming the authentication data, receiving one of a plurality of operation modes from the portable service controller, each operation mode specifying a plurality of vehicle components and respective thresholds for respective parameters of operation of the plurality of vehicle components; and
actuating one or more vehicle components below the respective thresholds associated with the operation mode according to user input provided to the portable service controller.

* * * * *